United States Patent
Rosengren et al.

(10) Patent No.: US 9,334,936 B2
(45) Date of Patent: May 10, 2016

(54) HIGH STIFFNESS THRUST COMPONENT FOR LINEAR ACTUATOR

(71) Applicant: Tolomatic, Inc., Hamel, MN (US)

(72) Inventors: Gary W. Rosengren, Brooklyn Park, MN (US); Ryan H. Bourgoine, Buffalo, MN (US); Jeremy R. Forbord, Mound, MN (US)

(73) Assignee: TOLOMATIC, INC., Hamel, MN (US)

( * ) Notice: Subject to any disclaimer, the term of this patent is extended or adjusted under 35 U.S.C. 154(b) by 109 days.

(21) Appl. No.: 14/098,104

(22) Filed: Dec. 5, 2013

(65) Prior Publication Data

US 2014/0311261 A1    Oct. 23, 2014

Related U.S. Application Data (60) Provisional application No. 61/813,360, filed on Apr. 18, 2013.

(51) Int. Cl.
*F16H 25/20* (2006.01)

(52) U.S. Cl.
CPC .......... *F16H 25/20* (2013.01); *F16H 2025/204* (2013.01); *Y10T 74/18568* (2015.01)

(58) Field of Classification Search
CPC combination set(s) only.
See application file for complete search history.

(56) References Cited

U.S. PATENT DOCUMENTS

| | | | |
|---|---|---|---|
| 4,510,565 A | 4/1985 | Dummermuth | |
| 4,841,113 A | 6/1989 | Hamada et al. | |
| 4,859,920 A | 8/1989 | Kurakake et al. | |
| 4,878,002 A | 10/1989 | Heatzig et al. | |
| 4,879,644 A | 11/1989 | Gottshall | |
| 4,908,556 A | 3/1990 | Daggett et al. | |
| 4,962,338 A | 10/1990 | Daggett et al. | |
| 5,241,250 A | 8/1993 | Nagasawa et al. | |
| 5,463,296 A | 10/1995 | Fugere et al. | |
| 5,931,047 A | 8/1999 | Ellqvist et al. | |
| RE36,631 E | 3/2000 | Tanabe et al. | |
| 6,072,145 A | 6/2000 | Suita et al. | |
| 6,124,693 A | 9/2000 | Okanda et al. | |
| 6,188,190 B1 | 2/2001 | Arakawa | |
| 6,469,272 B2 | 10/2002 | Dugas et al. | |

(Continued)

FOREIGN PATENT DOCUMENTS

| | | |
|---|---|---|
| EP | 0209604 A1 | 1/1987 |
| EP | 1 782 909 A1 | 5/2007 |
| WO | WO0101209 A1 | 1/2001 |

OTHER PUBLICATIONS

PHD Litstore "Product Packers: 6441-264 Series LC Escapement Information Sheet, CAT-6441264" accessed Oct. 6, 2015 at <http://litstore.phdinc.com/documentDesc.asp?catId=68>, 6 pages.

(Continued)

*Primary Examiner* — Dana Ross
*Assistant Examiner* — Renee L Miller
(74) *Attorney, Agent, or Firm* — Dorsey & Whitney LLP (57) ABSTRACT

An apparatus comprises an actuator having a motor, a housing and a thrust rod, where the actuator is configured to convert rotational motion of the motor into axial motion of the thrust rod. A movable holder is coupled to the thrust rod, and configured for axial motion of a tool coupling therewith. A bearing assembly is coupled to the actuator, extending along an axis thereof. The bearing assembly is configured to engage with the bearing to provide positional stability for the movable holder and tool coupling, when positioned along the actuator axis by motion of the thrust rod.

21 Claims, 9 Drawing Sheets

(56) References Cited

U.S. PATENT DOCUMENTS

| | | | |
|---|---|---|---|
| 6,828,522 | B2 | 12/2004 | Hochhalter et al. |
| 2005/0132830 | A1 | 6/2005 | Gerbier et al. |
| 2008/0196521 | A1* | 8/2008 | Chiang .............................. 74/20 |
| 2009/0239095 | A1 | 9/2009 | Desai et al. |
| 2012/0001499 | A1* | 1/2012 | Makino et al. ............. 310/12.14 |
| 2012/0043832 | A1* | 2/2012 | Neff et al. .................. 310/12.14 |
| 2013/0285494 | A1* | 10/2013 | Iversen et al. ................... 310/83 |

OTHER PUBLICATIONS

International Search Report and Written Opinion for PCT application PCT/US2014/026168, filed Mar. 13, 2014.

Series LC Single Rod Escapements (catalog). PHD, Inc., Jul. 11, 2012. Retrieved Jun. 26, 2014 from <http://litstore.phdinc.com/documentDesc.asp?catId=86>.

INCONEL alloy 600 (product literature). Special Metals Corporation, Sep. 2008. Retrieved Jun. 26, 2014 from <http://www.specialmetals.com/documents/Inconel%20alloy%20600%20%28Sept%202008%29.pdf>.

Lassner, E. et al., "Tungsten: Properties, Chemistry, Technology of the Element, Alloys, and Chemical Compounds," New York: Kluwer Academic/Plenum Publishers, 1998, ISBN 0-306-45053-4, p. 18. Retrieved from <http://books.google.com/books?id=foLRISkt9gcC&lpg=PP1&dq=inauthor%3A%22Erik%20Lassner%22&pg=PA18#v=onepage&q&f=false>. The year of publication is sufficiently earlier than the effective U.S. filing date and any foreign priority date so that the particular month of publication is not in issue.

* cited by examiner

HIGH STIFFNESS THRUST COMPONENT FOR LINEAR ACTUATOR

CROSS REFERENCE TO RELATED APPLICATIONS

This application claims priority to Provisional Application No. 61/813,360, High Stiffness Thrust Component for Linear Actuator, filed Apr. 18, 2013, which is incorporated by reference herein, in the entirety and for all purposes.

BACKGROUND

This disclosure relates generally to linear actuators, and specifically to linear actuators for use in robotic welding and other mechanized programmable tool applications. In particular, the disclosure relates to thrust components for linear actuators, including, but not limited to, increased strength, high stiffness thrust actuators and bearing assemblies configured for improved positional accuracy. Applications include resistance welding systems and other electromechanically actuated tools.

Industrial robots utilize a wide variety of different actuator technologies, in order to automate manufacturing processes including robot welding, injection molding, fixture clamping, packaging, assembly, surface coating, inspection, product testing, and other high-volume and precision production environments where speed, accuracy, machine endurance and service life are important cost and engineering factors. In welding applications, for example, robotic actuators may be used to position the welding gun with respect to a workpiece, and a linear actuator may be used to position the electrodes, for example in a short-stroke clamping operation for arc, spot or resistance welding, projection welding, and friction stir welding. Linear actuators are also used in a wide range of other programmable tool applications, including robotic, pedestal, and fixture-type operations.

Across these applications, actuator strength and weight considerations are design factors, particularly as related to operating speed and positioning accuracy. More specifically, there is a need for improved linear actuator configurations that can provide increased strength and positioning accuracy, with reduced actuator deflection and tool displacement, and without unduly increasing total tooling size, weight and cost.

SUMMARY

This application is directed to actuator systems, including, but not limited to, linear actuators for use in robot welders and other programmable mechanical tools. Representative actuator designs include components to improve positioning accuracy, for example a bearing assembly and/or a composite or two-component thrust rod with a high elastic modulus reinforcing insert.

In exemplary apparatus and system embodiments, the actuator may comprise a motor, a housing, and a thrust rod, with the actuator configured to convert rotational motion of the motor into axial motion of the thrust rod. A movable holder can be coupled to the thrust rod and configured for axial motion therewith, for example in combination with a coupling member for a machine tool.

A bearing can be coupled to the movable holder, and a bearing assembly can be coupled to the actuator or motor housing. The bearing may be configured for moving (e.g., sliding) engagement with the bearing assembly, and the bearing assembly can be configured for positional stability of the movable holder and tool coupling, when positioned along the actuator axis by the thrust rod.

For example, the bearing assembly may extend along the axis of the actuator housing, with the movable holder disposed therein. In additional examples, the bearing assembly comprises a top plate in sliding engagement with a major surface of the bearing (or bearing member). The bearing member may also have a substantially solid configuration, for example with a major surface in sliding engagement with an undersurface of the top plate.

The bearing assembly may also comprise two side plates positioned in sliding engagement with opposing edges of the bearing, for example with the movable holder spaced between the side plates. At least one of a rail or groove may extend axially along an inner surface of one or both side plates, configured for sliding engagement with one or both opposing edges of the bearing.

In any these configurations, a raceway, bearing strip or other bearing surface may be provided on the bearing assembly, in contact with the bearing member. For example, one or raceways, rails or bearing strips can be provided on the underside of the top plate or on the inside surfaces of the side plates, or both, and disposed in bearing contact with the bearing member which is coupled to the movable holder.

An insulating member can also be disposed between the bearing and the movable holder, for example so that the bearing and bearing assembly are electrically isolated from the movable holder and tool coupling. An insulating bushing or other insulating material can also be disposed between the thrust rod and the movable holder, so that the actuator is similarly electrically isolated from the movable holder and tool coupling.

A machine tool component can be attached to the tool coupling, for example a welding electrode. In addition, the thrust rod may be formed with or comprise a radially outer member and a radially inner member, for example where the radially inner member has a higher elastic modulus than the radially outer member.

DETAILED DESCRIPTION

This disclosure relates generally to linear actuators, and particularly to high strength thrust rods, bearing assemblies and other actuator components configured to provide accurate, reliable positioning for use in programmable tool applications such as robotic welding. Representative devices in which these components may be utilized include, but are not limited to, electric motor driven linear actuators. Particular examples of such devices are described in U.S. Pat. No. 6,828,522, "Adaptable Servo-control System for Force/Position Actuation," issued Dec. 7, 2004, U.S. Pat. No. 7,541,707, "Electric Actuator," issued Jun. 2, 2009, and U.S. patent application Ser. No. 13/481,265, "Linear Actuator with Anti-rotation Mechanism," filed May 25, 2012, each of which is incorporated by reference herein.

This disclosure is also related to linear actuator technologies for use in resistance welding. In this particular area, one approach to actuator design arises within the specific context of resistance welding of aluminum, where the need to weld aluminum is increasing due to economic and engineering factors in a number of industries, for example the constant desire of auto manufacturers to reduce vehicle weight and improve fuel efficiency.

While a number of techniques are used to weld aluminum, resistance welding may be favored based on speed and cost considerations, which in turn increases overall vehicle throughput and manufacturing efficiency. Resistance welding can also employ existing equipment and methods utilized to weld steel, as adapted the particular challenges of aluminum parts and components.

Generally, resistance welding occurs when an electrical current is momentarily passed through metal components, which are clamped between electrodes. To produce an acceptable resistance weld in aluminum, significantly higher levels of current are required, as compared to a steel weld. This is primarily because of the much higher thermal conductivity of aluminum, as described in detail below. Due to these higher current pulsing demands, greater electromagnetic reaction forces are generated at the tips of the welding electrodes, which can result in "jumping" or displacement of the actuator shaft and thrust tube.

The reaction forces can cause the welding gun and actuator assembly to deflect off axis, causing the electrodes to slip or skid out of the desired position and hampering the ability to produce acceptable welds. One approach to this problem is to add external bearing structures to the welding gun, in order to reduce such deflections. However, additional bearing structures may also add to total cost and weight, reducing the robot system's speed, capacity and overall economic value, requiring careful design to mitigate these factors. External bearing structures should also be designed to reduce placement of contamination-sensitive components close to the welding tool, or directly in the path of contamination created by the welding process.

Another approach is to create a stiffer thrust component, for example as a bearing assembly or composition thrust rod comprised of carbon steel and an additional material which has a significantly higher Young's modulus (or elastic modulus). While all carbon steels may have substantially the same elastic modulus of "stiffness," which is a material property and cannot be significantly altered for a given material composition and internal material structure, there are other materials with higher elastic moduli, including generically-defined heavy metals such as chromium, tungsten and molybdenum. These materials may be costly, however, and difficult to manufacture into the complex shapes required to operate a linear actuator, and to couple with an advanced welding gun or other complex programmable tool.

To address these concerns, the thrust component can be manufactured as a composite structure or assembly. The outer diameter of the thrust rod, for example, may be formed of carbon steel, providing machinability for desired functional features and allowing for the addition of environmentally protective surface treatments. The inner diameter or core can be formed as an insert of a heavy metal such as tungsten or molybdenum, or other suitable high elastic modulus material, which is positioned inside of the thrust rod assembly to enhance resistance to bending and deflecting due to high current reaction forces. In addition, a bearing plate or bearing assembly may also be provided, either alone or in combination with a composite thrust rod structure. The resultant improvements depend upon metallurgy and dimensions of the insert and bearing materials, and an increase in stiffness of about two times or more can reasonably be achieved, compared to existing designs, as described below.

Figure 1:
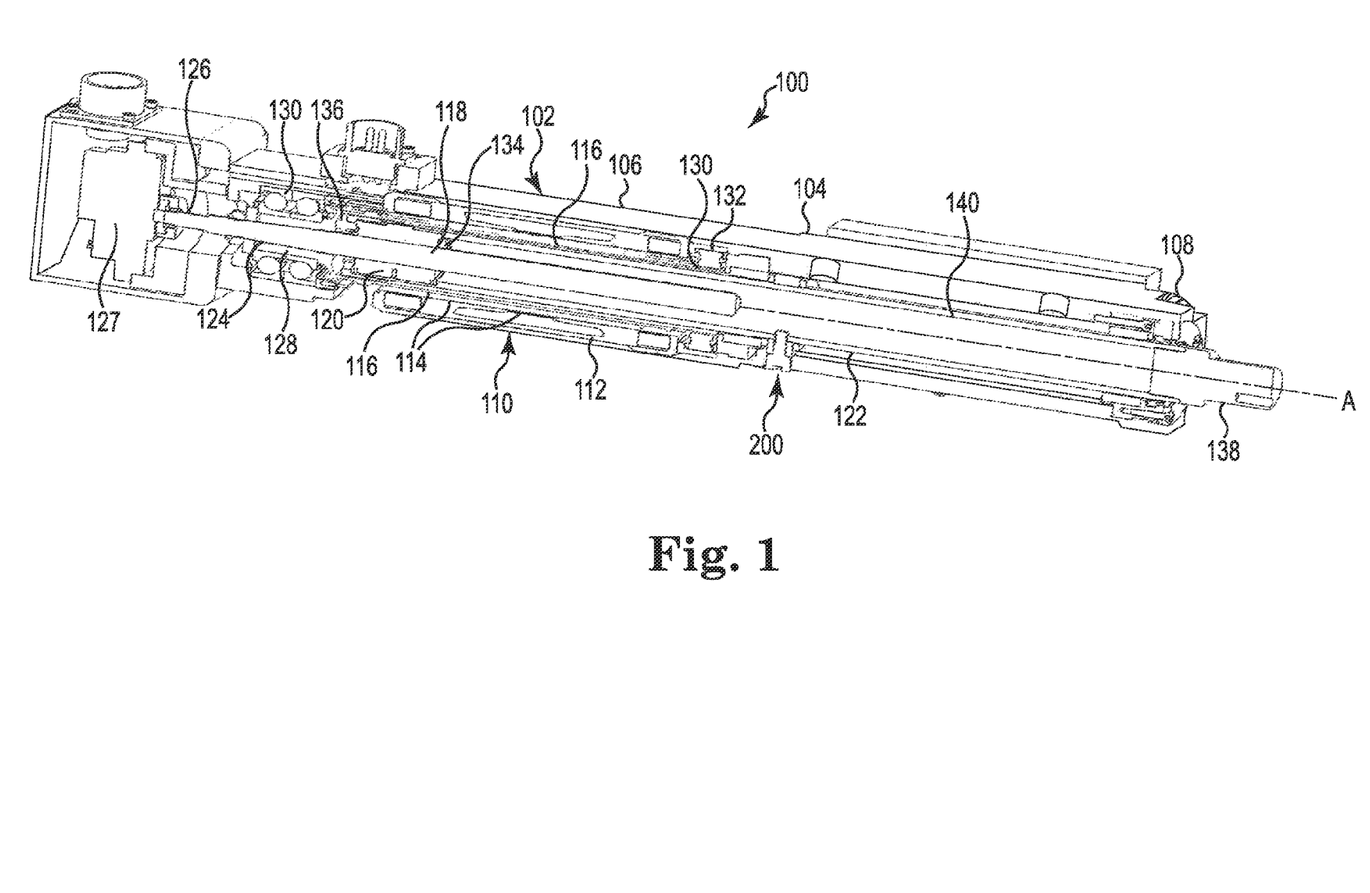
FIG. 1 is a cross-sectional perspective view of a linear actuator.

FIG. 1 is a cross-sectional perspective view of an electric motor driven linear actuator 100, with a thrust rod 122 configured to reduce deflection as a function of welding reaction forces and other off-axis loads. In this particular configuration, actuator 100 includes an actuator housing 102 and motor assembly 110. Distal end 104 and proximal end 106 of housing 102 can be coupled together by threaded rods or other mechanical couplings 108, with motor assembly 110 located inside.

As used herein, the terms "proximal" and "distal" are defined with respect to the internal components of actuator system 100, and the workpiece or tool coupling 138, located outside of housing 102. In particular, distal refers to the direction of coupling 138 (and any workpiece or tooling component connected thereto), and the term proximal refers to the direction away from coupling 138 (and any connected workpiece or tool). Alternatively, the terms may be interchanged without loss of generality, depending on design or drawing convention.

Motor 110 typically includes a number of motor windings 112, magnets 114 (e.g., permanent magnets or electromagnets), and a rotor 116. For example, motor 110 may be configured as a hollow shaft motor having one or more stationary motor windings 112, with a centrally located, hollow rotor 116 positioned radially inwardly of windings 112, inside housing 102. Conversely, windings 112 are positioned radially outwardly of rotor 116, for example being fixed to (or fixed relative to) actuator housing 102.

When motor 110 is provided in hollow shaft or hollow rotor form, as shown in FIG. 1, rotor 116 may have generally cylindrical outer and inner surfaces, with motor windings 112 and rotor 116 surrounding a centrally located linear thrust mechanism include a threaded shaft or lead screw 118, with nut (or thrust nut) 120 coupled to a thrust tube, thrust rod or other load transfer member 122. Alternatively, motor 110 may be provided in a generally parallel configuration with respect to the thrust mechanism, for example with a geared or belt drive. In other applications, actuator 100 may be provided with a travelling screw or shaft 118 and axially fixed nut 120, or an inverted screw design, as known in the art.

The thrust mechanism in configured to convert rotational motion of rotor 116 to linear movement of thrust rod 122. As shown in FIG. 1, for example, the thrust mechanism includes an externally threaded, elongated shaft or lead screw 118 in combination with an internally threaded nut 120, positioned radially inward of and substantially surrounded by rotor 116. In this configuration, lead screw 118 may include an externally threaded section, provided with threads along a substantial portion of the shaft length. As used herein, the terms "thread" and "threaded" may thus be used to define the main threaded section of lead screw 118, including, but not limited to, conventional threads, Acme or ACME type threads, roller screw threads, ball nut threads, and other threaded features suitable to convert rotational motion of rotor 116 to linear motion of thrust rod 122 and coupling 138.

Depending on design, lead screw 118 may also include a tapered section 124, for example tapering radially inward past threaded nut 120, toward the proximal extension (or end) 126 of lead screw 118. Proximal extension 126 may be formed as an unthreaded, reduced diameter section at the proximal end of lead screw 118. Tapered section 124 extends from extension 126 through hub 128 and may be rotationally coupled thereto, for example by providing the inner surface of hub 128 with a complementary taper, or with a lock and key arrangement.

Thrust bearing 130 can be positioned radially outward of hub 128, and configured to support hub 128 and proximal end 126 of lead screw 118 within actuator housing 102. Depending upon design, rotor 116 and hub 128 may be provided as a single, integrated component, or as separate parts. The proximal end of rotor 116 can also be rigidly connected with the axially extending (rotor mounting portion) of hub 128, so that rotation of rotor 116 causes a corresponding rotation of hub 128 and lead screw (or screw shaft) 118.

A rotary encoder 127 or other position sensor/controller may be mounted to proximal extension 126 of lead screw 118, utilizing a direct mechanical mount. For example, a hollow shaft (incremental or absolute) encoder 127 can be coupled to lead screw 118 using a threaded connection or other mechanical means, with the rotation sensor element mounted directly onto proximal extension 126. A coupling member can also be provided between proximal end 126 of lead screw 118 and encoder 127, for example with a flexible mounting structure to accommodate flexing and displacement due to axial and radial forces on lead screw 118 during operation of actuator system 100.

In some embodiments, the distal end of rotor 116 may be provided with a recessed portion to accommodate a bearing member 132 configured to support and stabilize the distal end of the rotor 116 relative to actuator housing 102. For example, an axially floating bearing 132 may be provided, which can float or travel in an axial direction (parallel to rotational axis A of rotor 116 and lead screw 118), in order to accommodate thermal expansion of rotor 116 and other components.

The central portion of rotor 116 can be provided with a number of magnets 114, mounted either along the outer surface of rotor 116, or inlaid within the outer surface of rotor 116, adjacent windings or coils 112. For example, rotor 116 can be machined to form axially extending channels or grooves along the central portion of rotor 116, and magnets 114 can be inlaid within the grooves, between the corresponding (and radially thicker) axial rib sections. This also may provide rotor 116 with thicker wall sections at the proximal and distal ends, extending axially on either side of magnets 114.

An axial channel and rib structure reduces the mass and moment of inertia of rotor 116, so that less torque is required for angular acceleration and deceleration. The outer (proximal and distal) ends of rotor 116 can also be provided with a plurality of holes or apertures extending through the wall sections, in order to further reduce inertia and torque requirement. In these forms, rotor 116 also facilitates simple assembly of motor 110, without requiring additional tooling for alignment, while providing sufficient material to reduce or limit core saturation due to the high flux density of magnets 114, and prevent flux leakage into the rotor core.

Threaded nut 120 is mechanically coupled to the proximal end of thrust rod 122. In one embodiment, for example, nut 120 is held in a cavity or pocket, as shown in FIG. 1, with locking end cap 136 attached to the proximal end of thrust rod 122. A cushion or impact reducing member 134 can be provided on the distal side of nut 120, opposite end cap 136, for example in the form of an O-ring or other suitable compressible material configured to protect nut 120 from damage during power up procedures, or in the case of a runaway drive command.

When motor 110 is operated, rotor 116 rotates in a first (e.g., clockwise) or second (counter-clockwise) direction about rotational axis A. The proximal end of rotor 116 is connected to lead screw 118 (e.g., via hub 128), so that rotation of rotor 116 results in a corresponding rotation of lead screw 118, in either the first or second direction.

Threaded nut 120 may include internal threads, for example recirculating ball threads, which mate with external threads on the outer surface of lead screw 118 to convert rotational motion of rotor 116 to linear (axial) motion of nut 120. Nut 120 and thrust rod 122 are coupled together, and thus move in unison along axis A when lead screw 118 is rotated by rotor 116 of motor assembly 110.

For example, nut 120 and thrust rod 122 may move in a distal direction in response to a first (clockwise) rotation of rotor 116 and lead screw 118, extending coupling member 138 away from housing 102 along axis A of actuator 100. Conversely, when motor 110 drives rotor 116 and lead screw 118 in the opposite (counter-clockwise) direction, nut 120 and thrust rod 122 move in a proximal direction along axis A, retracting coupling member 138 toward housing 102.

Alternatively, the threading configuration may be different, and the proximal and distal motions of thrust rod 122 may be reversed with respect to the rotation of lead screw 118. Thus, motor 110 is controllable to provide any desired linear or axial motion of thrust rod 122, coupling 138, and any workpiece or tooling connected thereto, based on the rotational motion of rotor 116 and lead screw 118. An anti-rotation mechanism 200 may also be provided to prevent rotation of thrust rod 122, so that a welding gun or other tooling can be connected directly to coupling 138, with or without external guide or bearing members.

Figure 2:
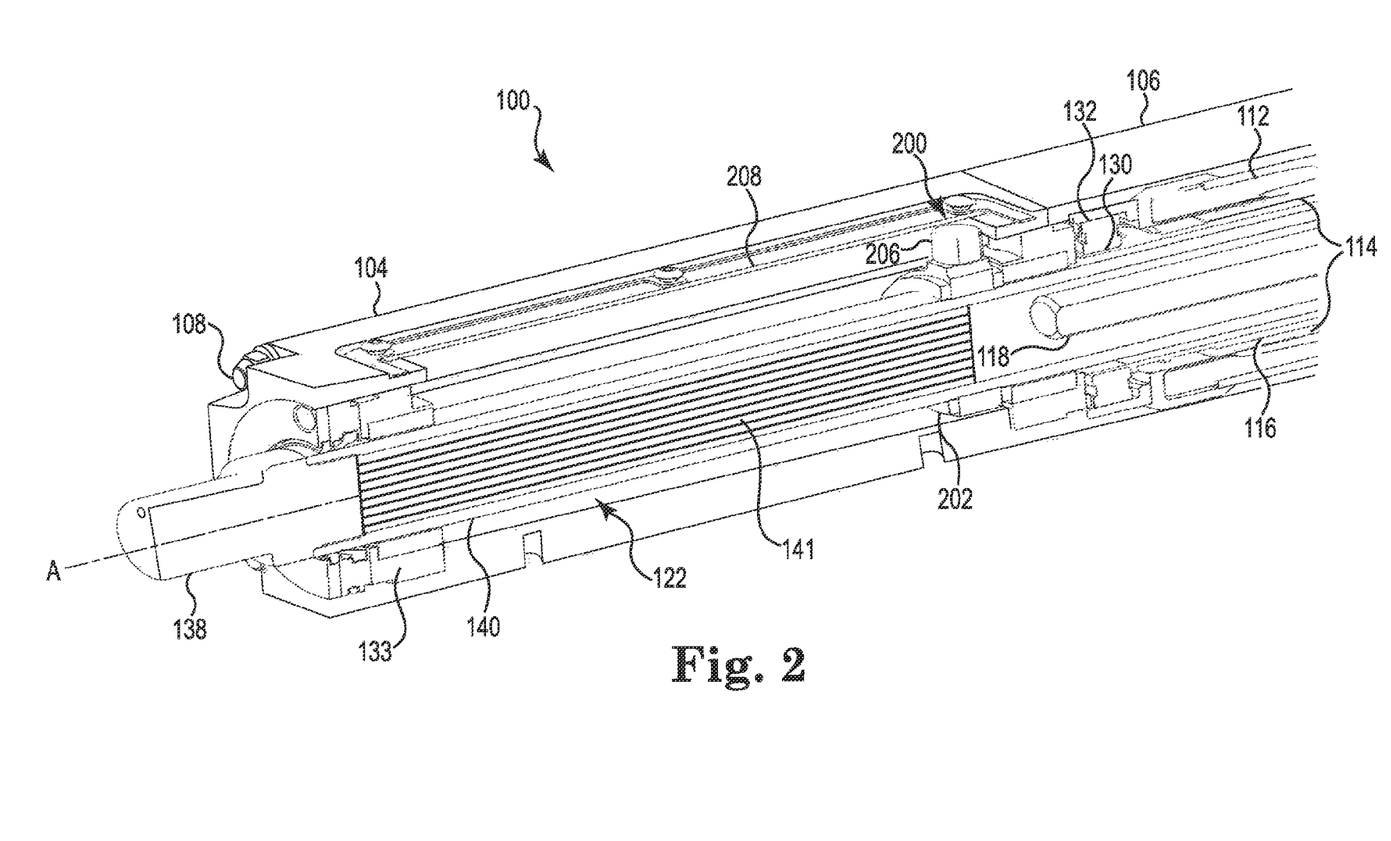
FIG. 2 is an alternate view of the actuator, illustrating the thrust rod component.

FIG. 2 is an alternate view of linear actuator 100, illustrating an increased stiffness design of thrust rod 122. As shown in FIG. 2, thrust rod 122 is formed as an elongated structure with an external thrust tube (or outer portion) 140, and an inner reinforcing member (or insert) 141.

Outer section 140 of thrust rod 122 extends along axis A, between a proximal end coupled to nut 120 (see FIG. 1) and a distal end connected to coupling member 138. Insert 141 extends inside the hollow interior of outer section 140, from the distal end at coupling (or connection) 138 to a location between coupling 138 and lead screw 118.

Thrust rod 122 is supported against radial motion by nut 120 at the proximal end, and by bushing 133 at distal end 104 of actuator housing 102. Bushing 133 may also be provided in the form of a bearing member, rather than bushing, and additional bearing members 130 and 132 can also be provided between nut 120 and rotor 116, in order to provide additional radial and axial support.

As shown in FIG. 2, anti-rotation mechanism 200 may be formed of a collar 202 fastened to (or integrally formed with) thrust rod 122. Cam follower 206 can be coupled to collar 202, for example with a roller bearing coupled to a stud and positioned within axially extending track 208, in order to prevent thrust rod 122 and nut 120 from rotating when lead screw 118 is driven by rotor 116 of motor assembly 110. The distal end of thrust rod 122 can also be provided with one or more anti-rotation features that engage with bushing 133 or distal end 104 of housing 102, for example using a hexagonal or other suitable configuration.

Outer section 140 of thrust rod 122 may be formed of a strong, hard metal such as steel, or another suitable metal or metal alloy. Insert 141 is typically formed of material with a higher elastic modulus than that of outer section 140, selected to increase stiffness and resistance to deflection. In addition, the outer surface of insert 141 is mechanically coupled to the inner surface of outer section 140, providing increased strength and rigidity to thrust rod 122.

In some embodiments, a compressive coupling is provided to increase the structural integrity of thrust rod 122, with the inner surface (or inner diameter) of outer section 140 providing a compressive loading on the outer surface of insert 141. For example, in disassembled form and at the same temperature, the outer radius of insert 141 may be substantially the same as, or slightly larger than, the inner radius of outer section 140, and a shrink fitting technique may be used in which insert 141 is cooled (e.g., in liquid nitrogen), or outer tube 140 is heated (e.g., by induction), or both, so that insert 141 fits inside the inner diameter of outer section 140. Then, when the temperatures reach equilibrium, outer section 140 shrinks with respect to insert 141, and provide a compressive loading. Alternatively, insert 141 could be coupled to outer section 140 by a different coupling or joining technique, including, but not limited to, brazing and adhesive bonding.

Alternatively, the mating surfaces of outer section 140 and insert 141 can be slightly tapered, and a compressive coupling can be achieved by inserting inner section 141 into outer section 140, and applying a mechanical force in the axial direction. Alternative coupling arrangements are also contemplated, as known in the art.

TABLE 1

ELASTIC MODULI OF SELECTED MATERIALS

| Material | Elastic (Young's) Modulus | |
|---|---|---|
| | GPa | $10^6$ psi ($10^3$ ksi) |
| Steel | 200-210 | 29-30 |
| Ni, Co, Ni—Fe Superalloys | 180-230 | 26-33 |
| Chromium (Cr) | 279-280 | 40-41 |
| Tungsten (W) | 400-410 | 58-60 |
| Tungsten Carbide (WC) | 450-650 | 65-95 |
| Tungsten Alloy (≥90% W) | 310-380 | 45-55 |
| Molybdenum (Mo) | 329-330 | 47-48 |
| Mo alloy (>99% Mo) | 320 | 46 |

Suitable materials for the thrust tube (outer portion 140 of thrust rod 122) include, but are not limited to, steel and other metals, for example Ni, Co, and Ni—Fe based superalloys. Generally, suitable materials for internal reinforcement 141 may have higher elastic moduli than the materials of outer section 140, and thus include, but are not limited to, chromium, high purity chromium alloys, tungsten, tungsten carbide, high-purity tungsten alloys, molybdenum, and high-purity molybdenum alloys, as shown in Table 1. Depending on embodiment, some high modulus superalloys may also be suitable for use in either insert 141 or outer section 140 of thrust rod 122, depending upon elastic modulus. Alternatively, the elastic moduli of outer section 140 and inner section 141 may be similar, or the material of outer section 140 may even have a slightly higher value of elastic modulus than insert 141.

Figure 3:
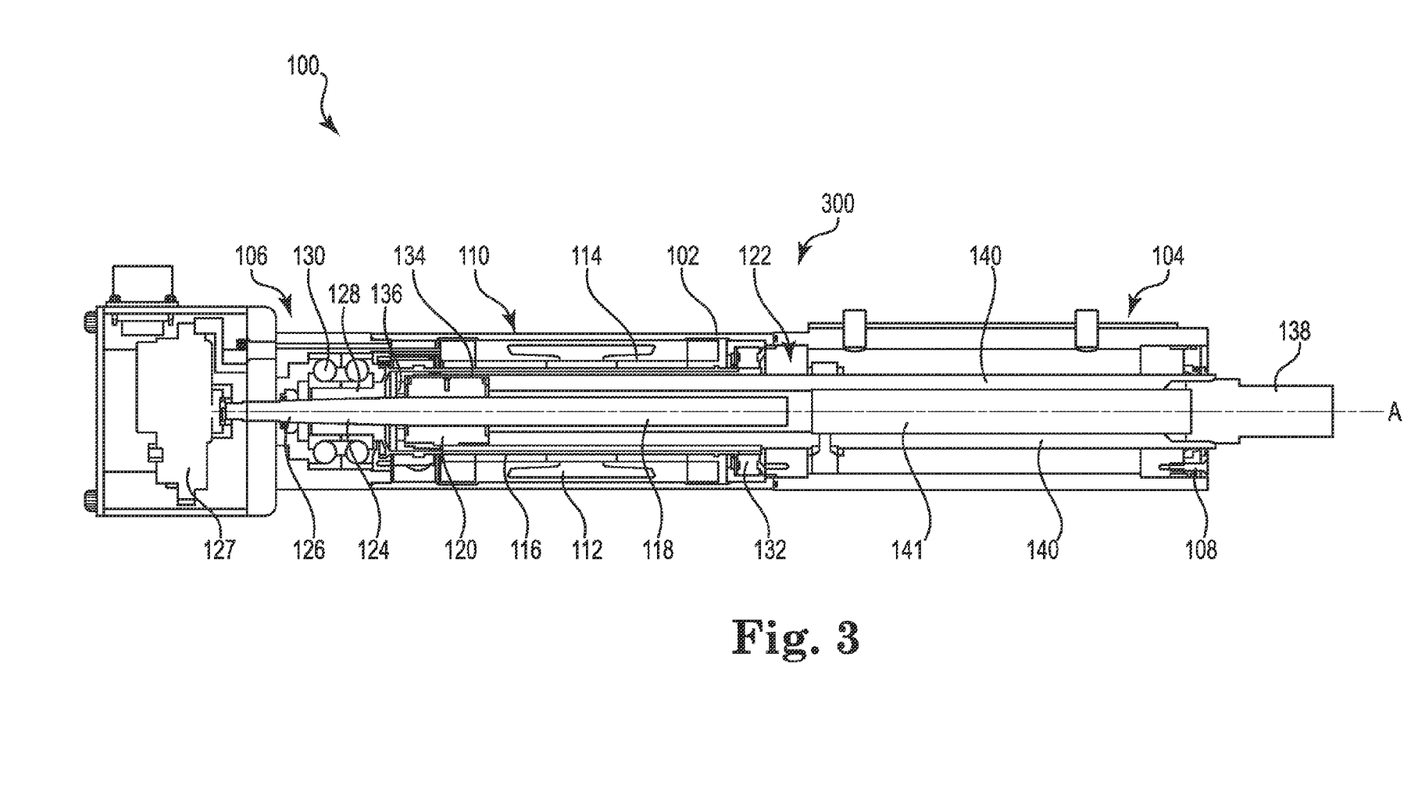
FIG. 3 is a cross sectional view of the actuator, showing the construction of the thrust mechanism.

FIG. 3 is a cross-sectional view of actuator system 100, showing the internal construction of thrust rod 122. Actuator system 100 includes housing 102 and motor assembly 110, with rotor 116 configured to drive a linear thrust mechanism 300 including thrust rod 122, for example as described above with respect to FIGS. 1 and 2.

As shown in FIG. 3, thrust rod 122 includes outer section 140 and reinforcing insert 141. Outer section 140 of thrust rod 122 extends from a distal end at tool coupling 138, to a proximal end at thrust nut 120. Insert 141 is coaxially arranged within outer section 140, extending from the distal end at coupling 138 toward lead screw 118, along axis A of thrust mechanism 300.

In this particular example, thrust nut 120 is rotationally coupled to thrust rod 122, for example with locking end cap 136 coupled to the proximal end of outer section (or outer thrust tube) 140. Nut 120 may include internal threads to convert rotational motion of lead screw 118 into linear motion of thrust rod 122 along axis A, with lead screw 118 driven by rotor 116 as described above with respect to motor assembly 110 of FIGS. 1 and 2.

In this configuration, outer section 140 of thrust rod 122 is typically hollow at the proximal end, in order to accommodate lead screw 118 when coupling 138 is retraced toward housing 102. Insert 141 may be substantially solid, as shown in FIG. 3, at least in the distal section of thrust rod 122 between lead screw 118 and coupling 138.

The configuration of motor assembly 110 varies based on application. For example, rotor 116 may surround a substantial portion of lead screw 118, supported at the distal end (opposite hub 128) by bearing 132. Alternatively, rotor 116 may be free (or unsupported) at the distal end opposite hub 128, in a cantilevered arrangement without bearing 132.

Thrust mechanism 300 can also be configured with an externally threaded nut 120 or axially translating lead screw 118. For example, lead screw 118 may be rotationally fixed but translate along axis A, and nut 120 may be linearly fixed but rotate about axis A. In these embodiments, thrust rod 122 may also be coupled to lead screw or shaft 118, so that rotation of motor assembly 110 drives nut 120 in rotation to produce axial movement of lead screw 118 and thrust rod 122.

An inverted screw type design can also be used, in order to convert rotational motion of rotor 116 into linear motion of thrust rod 122 and tool coupling 138. In additional examples, a parallel or offset configuration may be utilized, with motor and actuator assembly 100 and thrust mechanism 300 arranged in a side by side configuration, using a geared or belt-type drive mechanism to couple rotor 116 to lead screw 118.

Figure 4A:
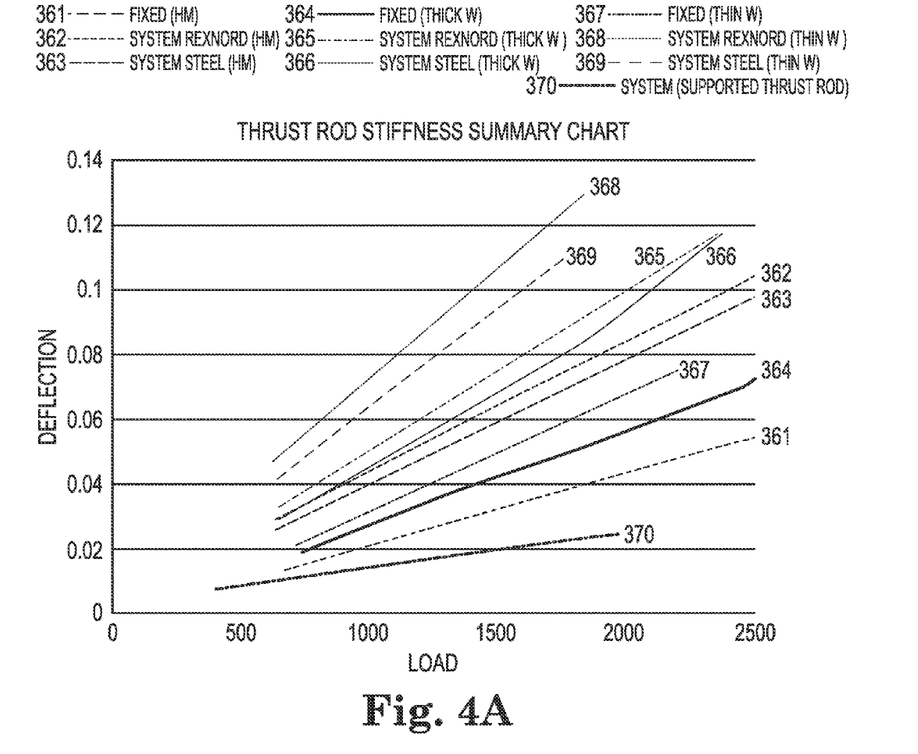
FIG. 4A is a plot of deflection versus load for different thrust rod configurations.
Figures 4B, 4C:
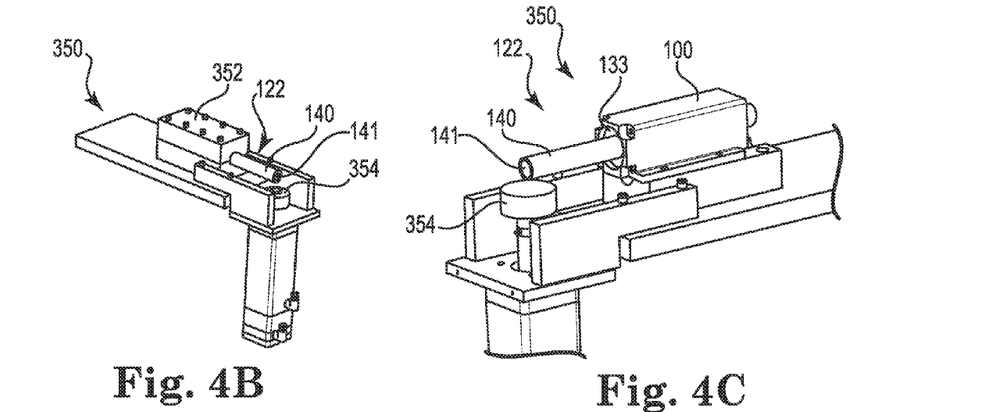
FIG. 4B is a schematic illustration of a test rig for generating the deflection data presented in FIG. 4A.
FIG. 4C is a schematic illustration of an alternate test rig for generating the deflection data.

FIG. 4A is a plot of deflection versus load for various different configurations of thrust rod 122, as described above with respect to linear actuator system 100 and thrust mechanism 300 of FIGS. 1-3. Radial deflection from the axis is given on the vertical scale, in arbitrary units (for example, in mm or inches). Load is given on the horizontal axis (for example, in newton-meter or pound-feet). FIGS. 4B and 4C are schematic illustrations of a test rig 350 for generating the deflection data presented in FIG. 4A, using a static test fixture 352 (FIG. 4B), or in a system configuration with thrust rod 122 installed in an example of actuator system 100 (FIG. 4C).

FIG. 4A presents results from nine different test configurations. Test line 361 "Fixed (HM)" provides deflection versus loading data for a heavy metal (HM) or high-modulus reinforced configuration of thrust rod 122, fixed in a static fixture 352 (FIG. 4B) with loading element 354 to provide the test load on rod 122. In this particular configuration, thrust rod 122 includes a solid tungsten reinforcement bar or insert 141, inside a thick-walled steel tube or outer section 140. Generally, the inner diameter (ID) of outer steel tube or section 140 may correspond approximately to the outer diameter (OD) of inner tungsten reinforcing rod 141. For example, a thick-walled outer section 140 may have a nominal outer diameter, for example about 1.5 inch (or 38.1 mm), and a nominal inner diameter, for example about 0.812 inch (or 20.6 mm). In reinforced insert embodiments, a bore (e.g., one inch, or 25.4 mm) may be machined into the inner diameter of outer section 140, corresponding to the outer diameter of insert 141, in assembled form. This allows for a compressive coupling between outer section 140 and insert 141, or another coupling technique such as brazing or adhesive bonding, as described above.

Test line 362 "System Rexnord (HM)" provides deflection data for a similar configuration of thrust rod 122, installed in an actuator system 100 (FIG. 4C). A composite (e.g., fiberglass/resin) bushing 133 is used, for example as provided by Rexnord Corporation of Milwaukee, Wis. Test line 363 "System Steel (HM)" provides data for another similar test configuration, using a steel bushing 133.

Test line 364 "Fixed (Thick W)" provides deflection data for thrust rod 122 in static test fixture 352 (FIG. 4B), with a thick-walled steel outer tube 140 (1.5 inch OD, 0.812 inch ID), and no insert 141. Test line 365 "System Rexnord (Thick W)" provides data for a similar configuration of thrust rod 122, installed in actuator system 100 (FIG. 4C). Test line 365 uses a REXNORD-type (composite) bushing 133, and test line 366 "System Steel (Thick W)" uses a steel bushing 133.

Test line 367 "Fixed (Thin W)" provides deflection data for thrust rod 122 in a static test fixture 352 (FIG. 4B), with a thin-walled steel outer tube 140 and no insert 141. In this configuration, steel outer tube 140 has a 1.5 inch or 38.1 mm outer diameter (OD), and a 1.188 inch or 30.2 mm inner diameter (ID). Test line 368 "System Rexnord (Thin Wall)" provides deflection data for a similar configuration of thrust rod 122, in an actuator system 100 with a composite bushing 133. Test line 369 "System Steel (Thin W)" uses a steel bushing 133.

Test line 370 "System (Supported Thrust Rod)" utilizes a bearing assembly or support structure, as described herein. In this configuration, thrust rod 122 is coupled to a movable holder or carriage structure, which is engaged by a bearing member inside a bearing plate assembly or other positioning structure, as described herein. As shown in FIG. 4A, these various configurations of the thrust assembly may provide substantially greater positional control, as compared to other devices without a composite thrust rod or bearing structure.

The data in FIG. 4A were accumulated over an extensive testing program designed to address issues of electrode and actuator deflection (or "jumping") in welding applications, particularly in aluminum welding and other high-current operations. Automotive manufacturers and other industries are beginning to utilize more aluminum enclosures and other aluminum parts, due to the substantial potential savings in weight and fuel economy. Aluminum, however, has a substantially higher thermal conductivity than steel, and a somewhat higher latent heat of fusion. This means that more energy may be required to produce a suitable weld, for example because of heat dissipation and other effects.

As a result, aluminum welds may require a significantly higher current that steel welds, for example 40-60 kA or more, which can be two to three times as great as a nominal steel weld current of 10-20 kA or less. Based on this, aluminum weld electrodes and actuators may be subject to substantially higher current pulses and corresponding electromagnetic effects, which can generate radial deflection loading, as described above. In turn, the deflection loads can lead to electrode jumping and actuator displacement, which may impact positioning accuracy and weld quality.

Based on this, a number of different approaches can be utilized to improve actuator stability, including the use of external bearing assemblies and thicker steel outer rod components, and/or replacing composite actuator parts with steel bushing components, for example a thin walled composite (e.g., REXNORD type) bushing with steel support material. Alternatively, a brass or bronze bushing material could also be used. In addition, the use of a high modulus reinforcing insert such as tungsten or molybdenum can also provide substantial benefit, for example by reducing deflection by as much as a factor of about two or more, as compared to the baseline (thin-walled) design, in the same or similar mounting configuration, and with or without an additional bearing assembly or other positioning structure.

More generally, deflection properties can be illustrated based on concentrated load modeling. For example, the deflection ($y_{max}$) of a cantilevered beam due to a force F may be described by:

$$y_{max} = \frac{Fl^3}{3EI}. \quad [1]$$

In this expression, F is force on the beam at a particular length (l) or distance from the fixed point, E is the Young's modulus (or elastic modulus), and I is the moment of inertia. The elastic modulus (E) and moment of inertia (I) both appear in the denominator, where the former is a material property while the latter depends upon beam geometry:

$$I = \frac{\pi}{64}(OD^4 - ID^4). \quad [2]$$

Thus, deflection can be reduced not only by selecting insert materials with a higher elastic modulus, for example tungsten and molybdenum based materials, but also by modifying the beam geometry to provide a greater moment of inertia (I). For example, the wall thickness of the outer steel member can be increased in order to decrease the inner diameter (ID), while still providing room for a heavy metal (high modulus) reinforcing beam, as described above.

Figure 5A:
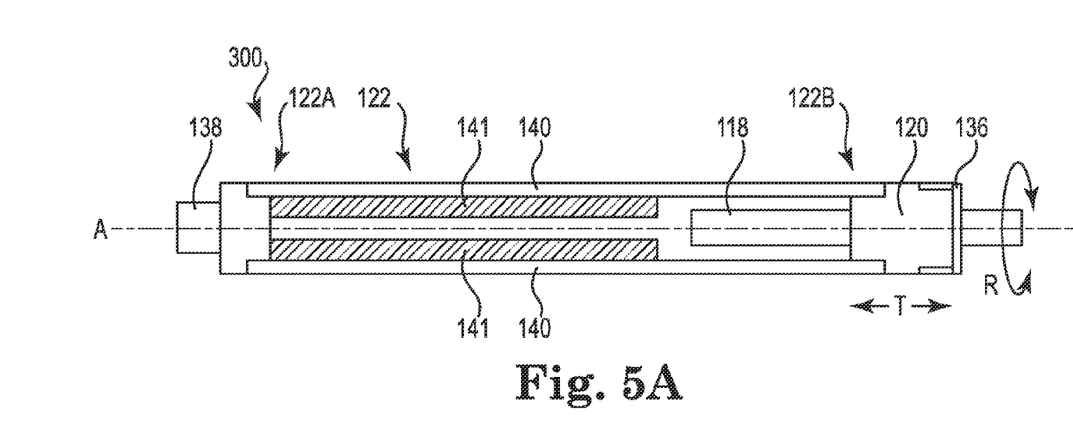
FIG. 5A is a cross sectional view of a linear thrust mechanism, showing the internal configuration of the thrust rod.

FIG. 5A is a cross sectional view of linear thrust mechanism 300, showing the internal construction of thrust rod 122. Outer section 140 of thrust rod 122 extends from tool coupling 138 at distal end 122A, to thrust nut 120 at proximal end 122B. Inner section 141 of thrust rod 122 is coaxially arranged within outer section 140, extending from coupling 138 at distal end 122A of thrust rod 122, and toward screw shaft 188 along axis A of thrust mechanism 300.

In this particular configuration, nut (or thrust nut) 120 is rotationally coupled to proximal end 122B of thrust rod 122, for example with locking end cap 136. Thrust nut 120 may include internal threads to convert rotational motion R of lead screw 118 about rotational axis A into linear motion T of thrust rod 122 along axis A, for example using a rotor 116 coupled to lead screw 118, as described above with respect motor assembly 110 of FIG. 3. Alternatively, thrust mechanism 300 may be configured with a rotating nut and axially translating screw shaft, or using an inverted screw design to convert rotational motion of a shaft or rotor to linear motion of thrust member 122 and tool coupling 138.

Outer section 140 of thrust rod 122 is typically hollow at proximal end 122B, in order to accommodate lead screw 118 when thrust rod 122 is in a retracted position. Insert 141 may also be hollow, but the inner diameter of insert 141 is not necessarily determined by the dimensions of lead screw 118, at least in distal end 122A of thrust rod 122, up to the point at insert 141 meets lead screw 118 in the retracted position of thrust mechanism 300.

Figure 5B:
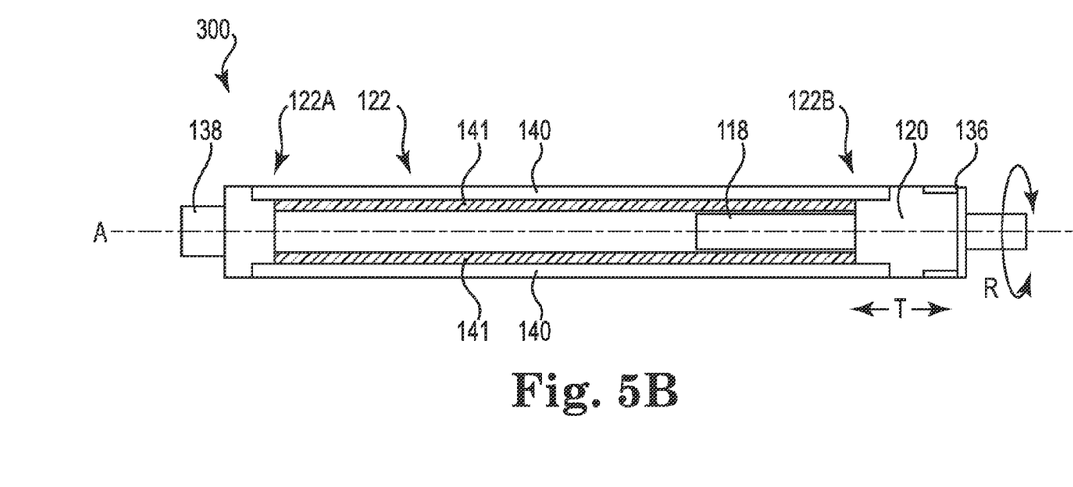
FIG. 5B is an alternate cross sectional view of the linear thrust mechanism, with a different thrust rod configuration.

FIG. 5B is an alternate cross sectional view of thrust mechanism 300, with a different internal configuration for thrust rod 122. In this example, outer section 140 of thrust rod 122 and insert 141 are both hollow, and the internal radius of insert 141 is sized to accommodate lead screw 118. In this configuration, insert 141 may extend substantially the full length of thrust rod 122, from coupling 138 at distal end 122A to nut 120 at proximal end 122B. Alternatively, insert 141 may extend for any length within the thrust tube or outer section 140 of thrust rod 122, and anywhere between distal end 122A and proximal end 122B, depending upon the desired strength and rigidity properties, and the selected mechanical couplings (or lack thereof) at nut 120 and tool coupling 138.

Figure 6:
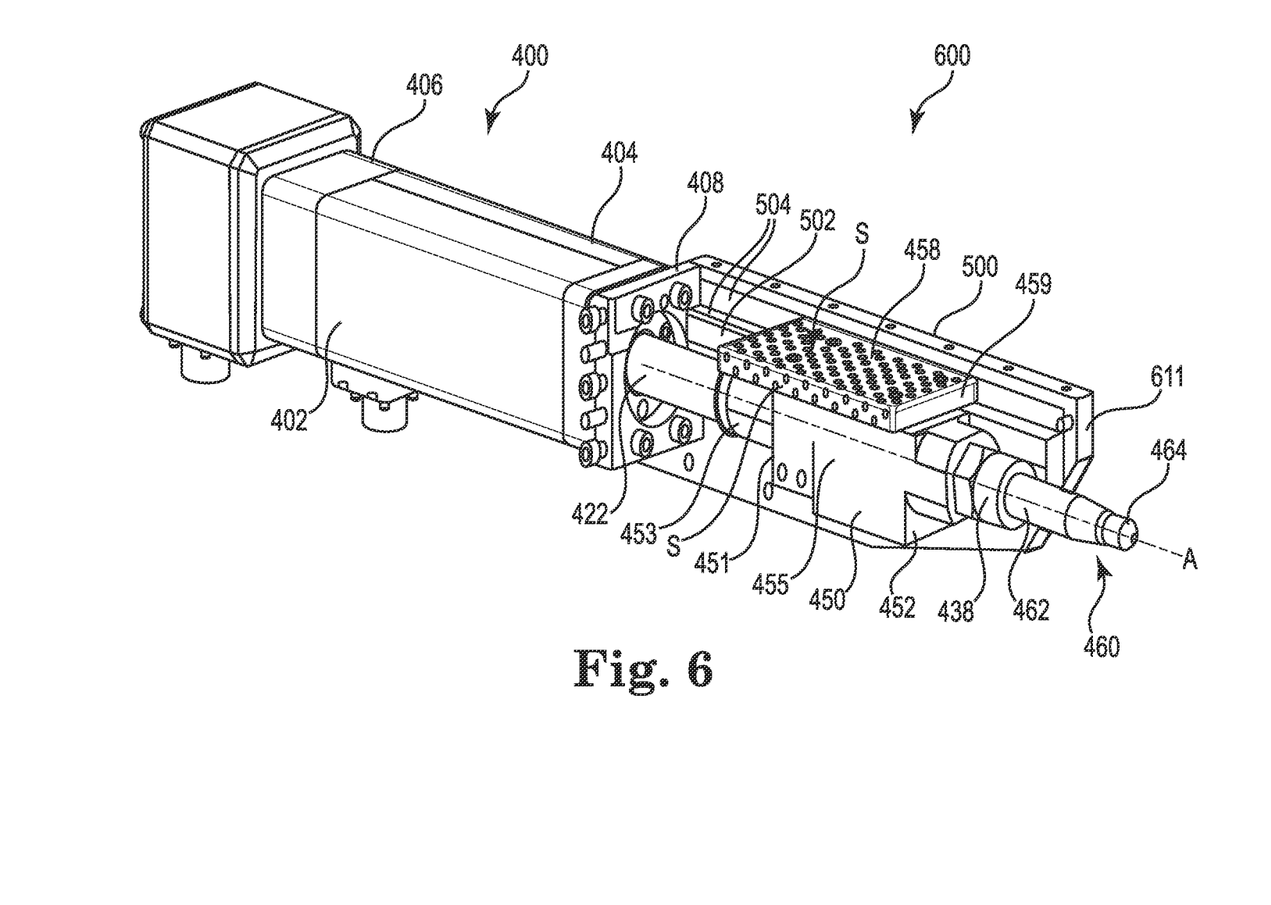
FIG. 6 is a schematic illustration of a motor driven linear actuator coupled to a bearing assembly.

FIG. 6 is a schematic illustration of a motor driven linear actuator 400 coupled to a bearing assembly 600 having at least one side bearing plate 500. In this particular view, the second side plate 500 and top plate 610 are attached with mechanical fasteners, and have been removed to show interior detail (see, e.g., FIGS. 7A and 7B). Alternatively, bearing assembly 600 may be machined from a block of material, or formed as a cast, weldment, or extruded structure, in combination with one or more machining steps to provide the desired geometry and other features.

Motor driven linear actuator 400 includes a housing 402 that houses a motor that can be similar to motor assembly 110 of FIG. 1. Distal end 404 and proximal end 406 of housing 402 can be coupled together by threaded rods or other mechanical couplings, with the motor assembly located inside. The motor is coupled to thrust rod 422 in the same or similar manner to any of the embodiments shown and described in FIG. 1, 2, 3, 5A, or 5B above.

Generally, the thrust mechanism is configured to convert rotational motion provided by the motor to linear movement of thrust rod 422. Distal end 453 of thrust rod 422 is coupled to movable holder 450, with rod end 453 engaging movable holder 450 at proximal side 451, opposite tool coupling 438 on distal side 452. For example, rod end 453 may extend into a coupling structure formed on or attached to the proximal side 451 or movable holder 450, or a similar coupling structure may be formed on or attached to rod end 453. Suitable mechanical attachments include a threaded coupling or other reversible coupling between rod end 453 and movable holder 450, for use in assembly and disassembly of thrust mechanism 400 and bearing assembly 600.

In welding applications, an electrical current connection may be provided on movable holder 450, in order to supply current through tool attachment 438 to electrode shank 462 and weld cap 464, or other tool arrangement 460. In these configurations, rod end 453 may utilize an insulating bushing or similar material, in order to electrically isolate thrust rod 422 and thrust mechanism 400 from movable holder 450, tool coupling 438, and tool 460. Tool coupling 438, in contrast, would typically be provided as a conducting element.

A plastic or polymer plate, glass composite material, or other insulating member 459 may be also provided between bearing member 458 and the top of movable holder 450, and insulating bushings may be utilized with any mechanical fasteners used to attach bearing 458, in order to electrically isolate bearing member 458 and bearing assembly 600 from movable holder 450 and tool 600. In these embodiments, the bottom of bearing assembly 600 may be left open for access, with the opposing sides 455 of movable holder 450 spaced from the inner surfaces of side plates 500 at a sufficient gap to avoid electric arcs.

Alternatively, insulating material may be provided between side plates 500 and moveable holder 450, or a combination of insulation and spacing can be employed. The gap spacing and insulating material are selected based on operating voltage and other conditions, including the potential need for insulating material disposed on one of both of the opposing sides of the movable holder and side plates, in order to prevent arcing when debris is present.

Tool coupling 438 is formed on or coupled to distal end 452 of movable holder 450. Tool coupling 438 may be similar to tool coupling 138 as described in FIG. 1, 2, 3, 5A or 5B above; for example, tool coupling 438 may provide for a threaded coupling or other detachable attachment to tool 460. In one particular embodiment, for example, tool 460 includes a shank or other element 462 that can be friction fit or threaded onto tool coupling 438, and a weld cap or other electrode structure 464. In other embodiments, any suitable machine tool or machine component 460 may be coupled to distal end 452 of movable holder 450, with or without a separate tool coupling 438.

In the arrangement shown in FIG. 6, movable holder 450 is characterized by a generally oblong or rectangular shape having first and second major opposing sides 455, defining a carriage or holder profile. Bearing (or bearing member) 458 has one or more bearing surfaces S, and is coupled to the top of movable holder 450. Bearing member 458 is configured to engage in movable or sliding relationship with bearing assembly 600, for example with a raceway, rail or other bearing structure 502 on the inside surface of side plate 500, or with the underside of the top cover (or top plate 600; see FIGS. 7A and 7B).

Side plates 500 and top plate 610 define the bearing profile, which forms the bearing engagement with bearing member 458. The bearing profile may include one or more bearing structures 502 configured to bear on the corresponding edge or surface of bearing member 458, for example in combination with a raceway, bearing strip or other bearing surface 504 disposed between the side plate or top plate and the corresponding surface of bearing 458. Similarly, the opposing edges or sides of bearing member 458 may also be configured to engage in a movable or sliding relationship with a groove or other bearing structure 502 on the top or side plates. A raceway, bearing strip, rail, or other bearing surface 504 may also be positioned on one or more of side plates 500 and top plate 610, providing a bearing surface and structure to guide bearing member 458 in axial motion with movable holder 450 and thrust rod 422 along axis A of actuator mechanism 400.

Suitable materials for top plate 610 and side plates 500 include aluminum and other metals and metal alloys. Bearing structure 502 may be formed on or attached to side plate 500, depending upon desired configuration. For example, various bearing structures 502 may be machined into the top and side plates, and different raceway, rail, and bearing strip structures 504 may be attached to the top and side plates, either alone or in combination with corresponding bearing structures 502.

Suitable materials for bearing member 458 include, but are not limited to, brass graphite materials, and other metal/graphite or composite-based bearing materials selected for friction and wear properties. In these examples, bearing member 458 may be conducting. Alternatively, an insulating material may be used, for example a durable polymer or durable polymer coated material.

Suitable materials for raceways, rails, bearing strips and other bearing surfaces 504 include, but are not limited to, steel and other durable metals. For example, bearing surfaces 504 may be formed of a steel or other metal alloy, selected for friction and wear properties and having electrochemical compatibility with the materials of bearing member 458 and actuator assembly 600.

During operation of linear actuator mechanism 400, thrust rod 422 urges movable holder 450 in linear motion along axis A toward and away from distal end 611 of bearing assembly 600. The edge profile of bearing member 458 is engage in sliding contact with the corresponding profile of side plate 500, for example along a rail or groove structure 502 with raceway or bearing surface 504 as described above, so that side plates 500 of bearing assembly 600 act to stabilize the axial and radial position of movable holder 450 and thrust rod 422 (e.g., transverse to axis A), and to improve corresponding positioning accuracy of movable holder 450 and tool 460 along axis A, during operation of actuator 400 and thrust rod 422.

Movable holder 450 and side plate 500 are formed from metal or nonmetal materials or combinations thereof. Useful metal materials include stainless steel, carbon steel, titanium and the like; nonmetal materials include carbon fiber-thermoplastic composites. A single such material or a combination of two or more materials are usefully employed in the manufacture of movable holder 450, side plate 500, or both. It will be appreciated that complementary bearing surfaces can be formed on side plates 500 by machining a groove or other structure into the material of side plate 500 to form a rail or other bearing structure 502, or by coupling a rail or other bearing structure 502 to the inner surface of side plate 500.

It will also be appreciated by one of skill that the shape of movable holder 450 may depend on the design and function of the motor driven linear actuator 400. While the arrangement shown in FIG. 6 is characterized by a generally rectangular or oblong (e.g., parallelepiped) movable holder 450 with generally planar sides 455 spaced from the corresponding inner surfaces of side plates 500, the configurations of moveable holder 450 and bearing assembly 600 are not limited only to this configuration, and various other geometries are also possible.

In some embodiments, side plate 500 is attached to the motor driven linear actuator 400, for example at distal end 404 of the housing, or at bulkhead 408. In other embodiments, side plate 500 is not attached to motor driven linear actuator 400. In such embodiments, side plate 500 is attached to an apparatus that is also attached to the motor driven linear actuator 400, wherein actuator 400 and side plate 500 are attached separately to the same apparatus.

In still other embodiments, side plate 500 is attached to the motor driven linear actuator 400 and is further attached to the apparatus of which motor driven linear actuator 400 is a part. In these embodiments, side plate 500 engages movable holder 450 via a bearing member 458 to stabilize the position of movable holder 450 and tool coupling 438 along axis A of actuator 400, and to improve positioning accuracy for tool 460 coupled to movable holder 450.

Figure 7A:
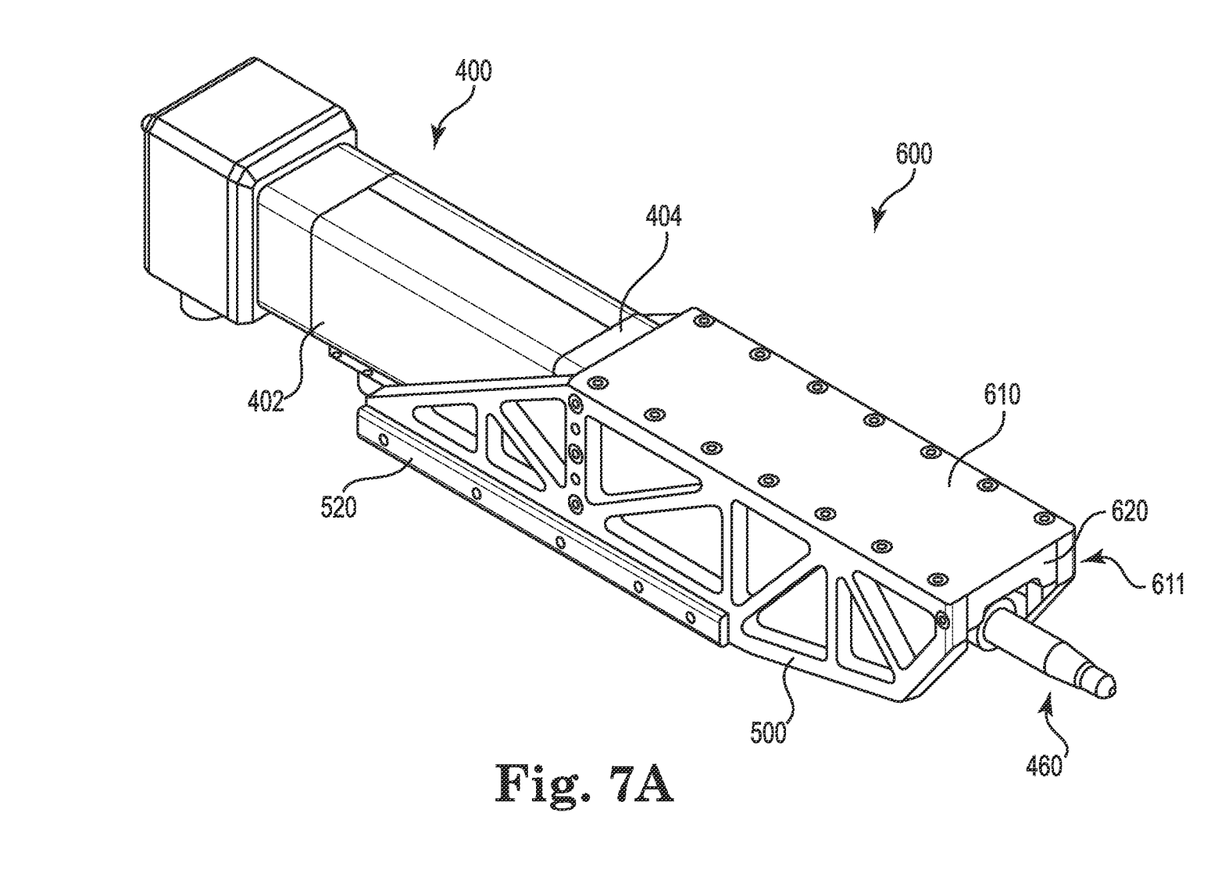
FIG. 7A is a schematic illustration of the linear actuator engaged with a bearing assembly.
Figure 7B:
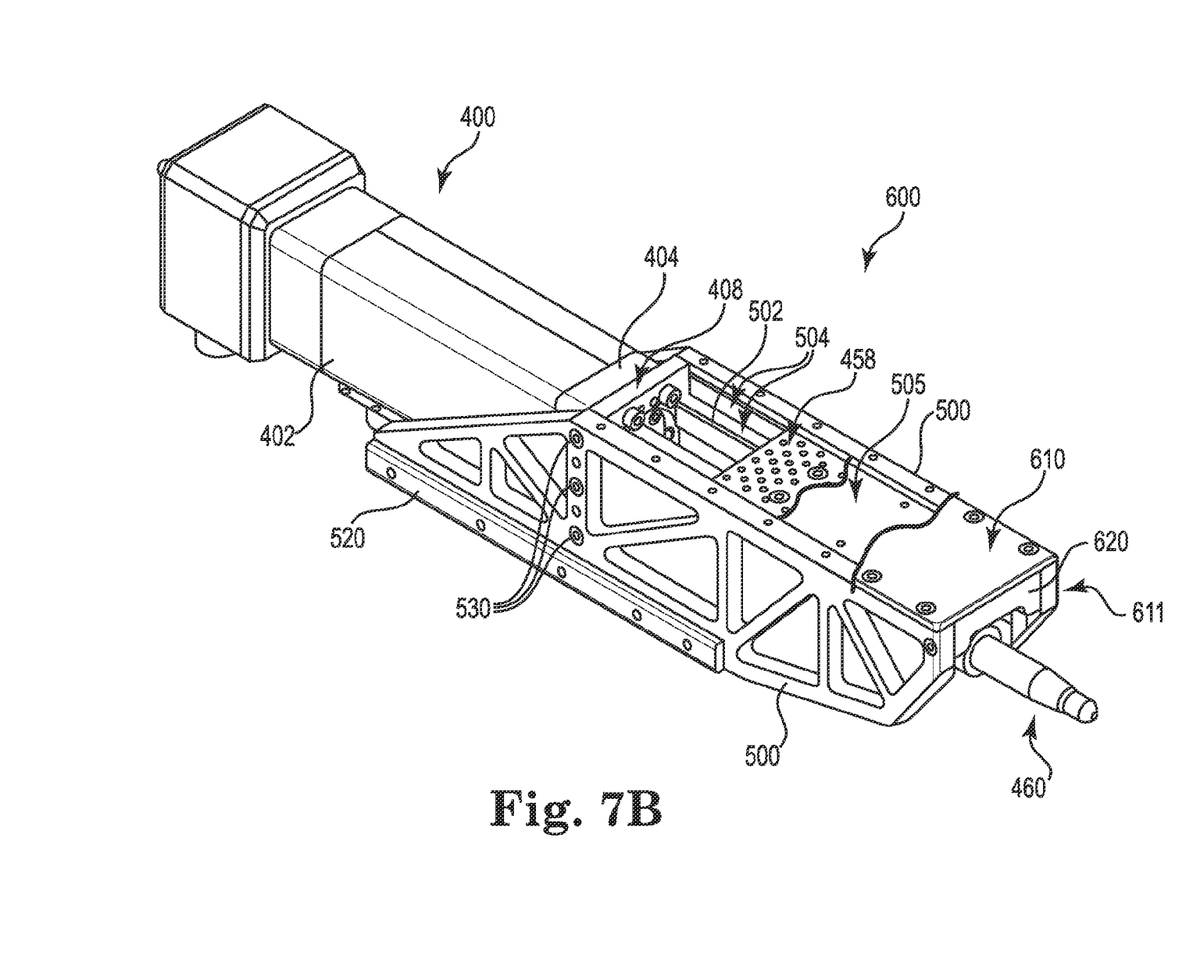
FIG. 7B is an alternate schematic illustration of the linear actuator.

FIGS. 7A and 7B are schematic illustrations of the motor driven linear actuator 400 from FIG. 6, coupled to a bearing assembly 600. In FIG. 7A, bearing assembly 600 is provided with two side plates 500 and a top plate or cover 610, spanning the actuator axis and connected to side plates 500 using mechanical fasteners or other suitable attachments. Crossbar 620 spans side plates 500 at distal end 611 of assembly 600, and can be configured to accommodate motion of tool 460. An expulsion shield or other structure may also be provided, positioned about tool 460 in order to discourage entry of welding expulsion and other debris, for example between the sides 455 of movable holder 450 and the inner surfaces of side plates 500 (see FIG. 6).

The outer wall of side plate 500 may have a gusseted or other reinforced structure, as shown in FIG. 7A, for example to provide increased strength, for weight reduction, or to produce a combination thereof. Side plate 500 may also bear a fastening rail 520 or other attachment feature, useful for fastening bearing assembly 600 to a machine apparatus such as a welding tool, tool frame, or other mechanical structure.

FIG. 7B shows linear actuator 400 and bearing assembly 600 of FIG. 7A, with top plate or cover 610 partially cut away to show interior detail. In this view, it can be seen that bearing assembly 600 is further attached to actuator assembly 400 via bulkhead 408 at distal end 404 of the housing 402, for example using machine screws, bolts or other mechanical fasteners 530. Bearing member (or bearing) 458 is provided in sliding engagement with grooves or rail structures 502 extending along the axial length of side plates 500, on the interior surface facing bearing member 458.

Bearing strips 504 or other suitable bearing surfaces may be provided between bearing member 458 and bearing structures 502 on side plates 500 of assembly 600, for example in a raceway, bearing rail, or bearing strip configuration as described above. In addition, a top bearing strip 505 may also be provided between the top of bearing 458 and the complementary bearing surface on the underside of top plate 610, or a raceway or bearing rail may be used.

Suitable materials for top plate 610 include aluminum and other metals, as described above for side plates 500. Alternatively, top plate 610 may be formed of steel or another metal with suitable wear and frictional properties, and top bearing strip 505 may be absent. In additional embodiments, rails 502 or other bearing structures may be formed of a similar material selected for wear and frictional properties, and one or more separate bearing strips 504 may be absent.

As shown in FIG. 7B, the top surface of bearing 458 forms a major bearing surface between the movable tool holder and the underside of bearing assembly 600. In welding applications, this bearing structure may configured to sustain substantial shock loading experienced during the welding pulse. In shock loaded configurations, bearing 458 may be formed as a substantially solid bearing structure, as shown here, with a major surface disposed in engagement with the bearing assembly, for example the underside of the top plate, in order to provide for greater load transfer along the major bearing surface.

Alternatively, one or more roller bearing or ball bearing assemblies may also be used, for example along the edges of bearing member 458 and rails 502 (e.g., in place of, or supplemental to, bearing strips 504, or with a raceway or bearing rail type bearing surface 504). Similarly, roller bearing or ball bearing component may also by utilized along top the top surface of bearing member 458, between bearing member 458 and the underside of top plate or cover 610. In these configurations, however, the bearing surface area may be reduced, as compared to the solid bearing arrangement. Thus, the shock loading capabilities of the two configurations may not be equivalent, and the major surface engagement of a solid (e.g., rectangular or parallelepiped) bearing 458 may provide for greater load transfer, whether under shock loading or otherwise.

The embodiments of FIGS. 7A and 7B exemplify the use of a movable holder 450 having opposing sides 455 (in FIG. 6); and a bearing assembly 600 with a top plate 610 and/or side plates 500 configured to engage bearing member 458, which is coupled to movable holder 450 to stabilize the position of tool coupling 438 along axis A of actuator mechanism 400.

For example, bearing member 458 may be coupled to movable holder 450 in a sliding and bearing relationship with the underside of top plate 610, for further control of tool coupling 438 and tool 460. Movable holder 450 may also have a generally polygonal or cylindrical configuration, or other geometry with one or more bearing members 458 coupled thereto, and engaged in sliding and bearing relationship with corresponding bearing features on the inner surfaces of side plates 500 and/or the underside of top plate 610.

In FIGS. 6, 7A, and 7B, tool 460 may take the form of a welding machine component but the invention is not limited to welding applications. Any suitable tool 460 benefiting from the linear motion actuated by motor driven linear actuator 400 can be usefully employed in conjunction with the motor driven linear actuator 400 and bearing assembly 600. Examples of tools that benefit from the use of such a system or apparatus include, but are not limited to, robotic and automated positioning equipment configured for manipulating a workpiece, robotic and automated machine tools configured for machine operations on a workpiece, and other robotic and automated machine tool applications.

Figure 8:
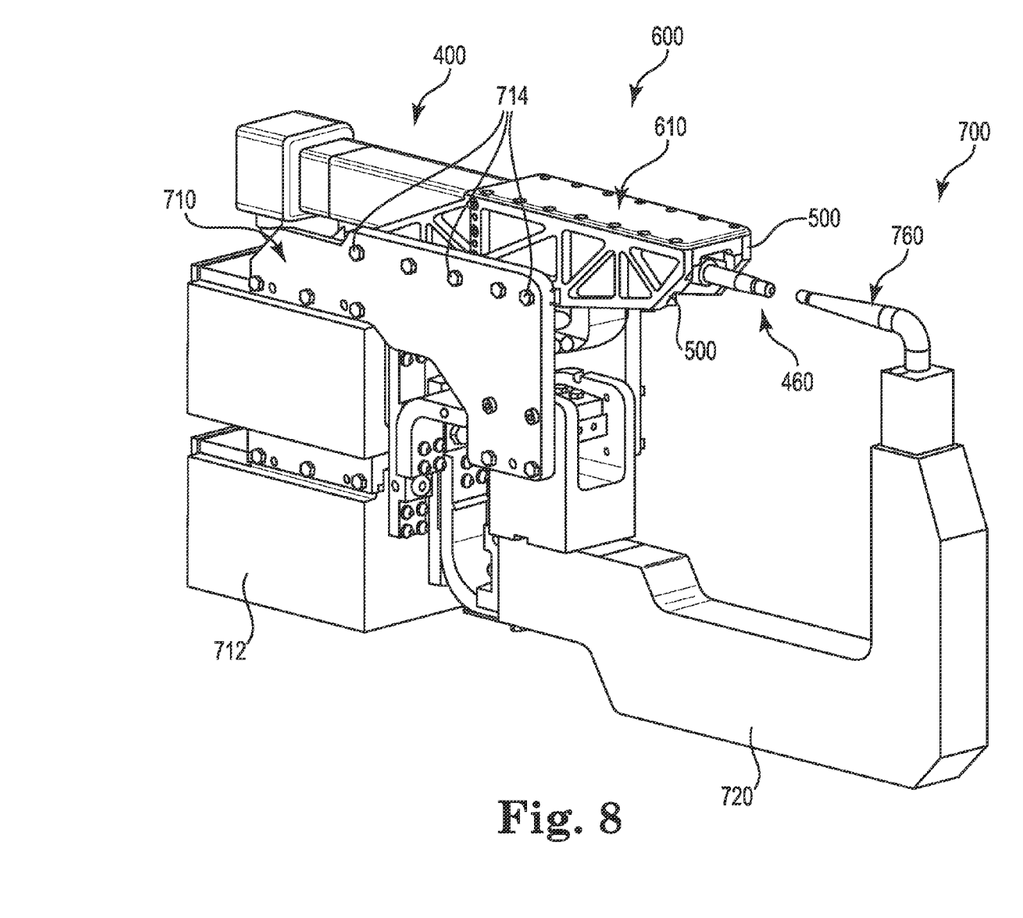
FIG. 8 is a schematic illustration of the linear actuator and bearing assembly.

FIG. 8 shows one example of a machine system or apparatus including the combination of a motor driven linear actuator 400 and bearing plate assembly 600. In this particular embodiment, a motor driven linear actuator 400 and bearing assembly 600 are attached to a machine tool or similar apparatus 700, for example a welding gun.

As shown in FIG. 8, actuator 400 and bearing assembly 600 are attached to machine frame 710 utilizing a number of mechanical fasteners 714, for example in combination with a fastening rail 520 as shown in FIGS. 7A and 7B. Machine frame 710 is coupled to welding machinery 712, with arm 720 extending from machine frame 710 to a second welding tool or electrode 760.

In the welding gun embodiment of FIG. 8, actuator 400 is coupled to bearing assembly 600 for positioning a welding electrode or similar tool 460. Welding apparatus 700 including machine frame 710, machinery 712 and extension arm 720 is configured to position a second welding electrode or similar tool 760 opposite first electrode 460. In this configuration, actuator 400 and bearing assembly 600 are operable to facilitate welding operations by actuation of tool 460 via a thrust rod coupled to a movable holder disposed in bearing relationship within bearing assembly 600. Actuator mechanism 400 urges the movable holder, tool coupling, and tool 460 along the actuator axis toward a workpiece and/or second electrode 760, in order to effectuate a weld. Bearing assembly 600 is engaged in a movable or slidable bearing relationship with the movable holder via bearing 458, in order to improve positioning accuracy and stability along the actuator axis for the tool coupling and tool 460. Actuator mechanism 400 and bearing assembly 600 also provide resistance to shock loading, for example when tool 460 is subject to electromagnetic forces due to a welding current or current pulse.

During operation of actuator 400, bearing assembly 600, attached to frame 710 of apparatus 700, improves the stability of the axial and radial positioning of the thrust rod 422 (e.g., along the actuator axis and transverse or perpendicular to axis A as shown in FIG. 6). These and other examples of the bearing assembly and/or high strength thrust rod configurations also improve positioning accuracy of the thrust rod 422 during operation of motor driven linear actuator 400. After a movable holder 450 bearing a tool 460 is positioned toward distal end 611 of bearing assembly 600 (as shown in FIG. 6), and during application of current (e.g., a high current welding pulse) through shank 462 and electrode cap 464, bearing assembly 600 further provides axial and transverse position stability of tool 460 during application of current thereto.

In embodiments related to the example shown in FIG. 8, apparatus 700 may be configured, for example, an industrial drill or drive apparatus, a robotic or automated machine apparatus, an aluminum welding or machining apparatus, or another machine tool or robotic manipulation apparatus. One of skill understands that the tool 460 attached to tool coupling 438 (FIG. 6) will vary according to the end use intended for apparatus 700, and the materials used to form the apparatus 700, including frame 710, will vary according to the intended application.

Actuator 400 and bearing assembly 600 may each be coupled to tool frame 710 via similar mechanical fasteners 714 such as bolts, or by screws, pins, rivets, welds or the like. In some embodiments, bearing assembly 600 may be reversibly or removably attached to apparatus 700, for example to aid in assembly, adjustment and repair, or to replace machine tool apparatus 700 as necessary.

In some embodiments, frame 710 is directly attached to fastening rail 520 (shown in FIGS. 7A and 7B), without using an actuator fastening bracket or other structure. In such embodiments, one or both of actuator 400 and bearing assembly 600 may be directly attached to frame 710. Alternatively, a mounting bracket or other suitable mechanical structure may be employed, as determined by the particular shape, strength, positional stability, and other operating requirements of machine apparatus 700, actuator 400, and bearing assembly 600.

While this invention has been described with reference to exemplary embodiments, it will be understood by those skilled in the art that various changes can be made and equivalents may be substituted for elements thereof, without departing from the spirit and scope of the invention. In addition, modifications may be made to adapt the teachings of the invention to particular situations and materials, without departing from the essential scope thereof. Thus, the invention is not limited to the particular examples that are disclosed herein, but encompasses all embodiments falling within the scope of the appended claims.

The invention claimed is:

1. An apparatus comprising:
    an actuator comprising a motor, a housing and a thrust rod, the actuator configured to convert rotational motion of the motor into axial motion of the thrust rod;
    a movable holder coupled to the thrust rod and configured for axial motion therewith, the movable holder comprising a tool coupling;
    a bearing coupled to the movable holder; and
    an external bearing assembly coupled to the actuator at a distal end of the housing and extending along an axis therefrom, the bearing assembly configured to engage with the bearing to provide positional stability for the movable holder and tool coupling along the actuator axis;
    wherein the bearing assembly comprises two side plates in sliding engagement with opposing edges of the bearing and the movable holder is spaced between the side plates.

2. The apparatus of claim 1, wherein the bearing assembly comprises a top plate in sliding engagement with a major surface of the bearing, the major surface of the bearing disposed in the sliding engagement with an underside of the top plate.

3. The apparatus of claim 2, wherein the bearing has a substantially solid configuration.

4. The apparatus of claim 2, further comprising a bearing strip disposed between the bearing assembly and the bearing coupled to the movable holder, the bearing strip configured for bearing engagement with a corresponding surface of the bearing.

5. The apparatus of claim 2, further comprising at least one of a rail or groove extending axially along an inner surface of the side plates, the opposing edges of the bearing in sliding engagement with the rail or groove.

6. The apparatus of claim 1, further comprising an insulating member disposed between the bearing and the movable holder, wherein the bearing is electrically isolated from the movable holder and tool coupling.

7. The apparatus of claim 6, further comprising an insulating bushing disposed between the thrust rod and the movable holder, wherein the actuator is electrically isolated from the movable holder and tool coupling.

8. The apparatus of claim 7, further comprising a welding electrode attached to the tool coupling and an expulsion shield to discourage entry of welding expulsion and other debris between the movable holder and the side plates.

9. The apparatus of claim 1, wherein the thrust rod comprises a radially outer member compressively coupled to a radially inner member, the radially outer member providing a compressive loading on the radially inner member and the radially inner member having a higher elastic modulus than the radially outer member.

10. The apparatus of claim 9, wherein the radially inner member comprises a heavy metal selected from the group of chromium, tungsten and molybdenum, or an alloy thereof.

11. An actuator system comprising:
  a motor disposed within a motor housing and a thrust rod extending along an axis from the motor housing, wherein the motor is configured to position the thrust rod along the axis;
  a movable holder coupled to the thrust rod;
  a bearing member coupled to the movable holder; and
  an external bearing assembly coupled to a distal end of the housing and extending along the axis therefrom in bearing engagement with the bearing member, the bearing assembly configured for positional stability of the movable holder in motion with the thrust tube along the axis;
  wherein the bearing assembly comprises a pair of opposing side plates extending along the axis and engaged in a sliding relationship with opposing edges of the bearing member, the movable holder disposed along the axis and spaced between the side plates.

12. The actuator system of claim 11, wherein the bearing assembly comprises a top plate spanning the axis across the side plates, the bearing member disposed with a major surface in sliding engagement with an underside of the top plate.

13. The actuator system of claim 11, further comprising a bearing strip extending along each of the side plates, the bearing strip disposed in bearing relationship with the opposing edges of the bearing member.

14. The actuator system of claim 11, wherein the movable holder is electrically insulated from the motor housing and bearing assembly.

15. The actuator system of claim 14, further comprising a welding electrode coupled to the movable holder and an expulsion shield to discourage entry of welding expulsion and other debris between the movable holder and the side plates.

16. The actuator system of claim 11, wherein the bearing member comprises a substantially solid bearing having a major surface in sliding engagement with the bearing assembly.

17. The actuator system of claim 16, further comprising a coupling member attached to a distal end of the movable holder opposite the thrust rod, the coupling member configured to attach a machine tool component.

18. The actuator system of claim 17, further comprising an insulating member disposed between the bearing member and the movable holder, wherein the insulating member is configured to electrically isolate the bearing assembly from the machine tool component.

19. A linear actuator system comprising:
  an actuator comprising a motor, a housing and a thrust rod, the actuator configured to convert rotational motion of the motor into axial motion of the thrust rod;
  wherein the thrust rod comprises a radially outer member compressively coupled to a radially inner member, the radially outer member providing a compressive loading on the radially inner member and the radially inner member having a higher elastic modulus than the radially outer member;
  a movable holder coupled to the thrust rod and configured for axial motion therewith, the movable holder comprising a tool coupling;
  a bearing coupled to the movable holder; and
  an external bearing assembly coupled to the actuator at a distal end of the housing and extending along an axis therefrom, the bearing assembly configured to engage with the bearing to provide positional stability for the movable holder and tool coupling along the actuator axis;
  wherein the bearing assembly comprises two side plates in sliding engagement with opposing edges of the bearing, the movable holder spaced between the side plates, and a top plate in sliding engagement with a major surface of the bearing, the major surface of the bearing disposed in the sliding engagement with an underside of the top plate.

20. The linear actuator system of claim 19, further comprising a welding electrode attached to the tool coupling and an expulsion shield to discourage entry of welding expulsion and other debris between the movable holder and the side plates.

21. The linear actuator system of claim 19, further comprising an insulating member disposed between the bearing and the movable holder, wherein the bearing is electrically isolated from the movable holder and tool coupling.

* * * * *